J. E. FLETCHER.
STEAM GENERATION.
APPLICATION FILED MAY 6, 1911.
998,568.
Patented July 18, 1911.
2 SHEETS—SHEET 1.
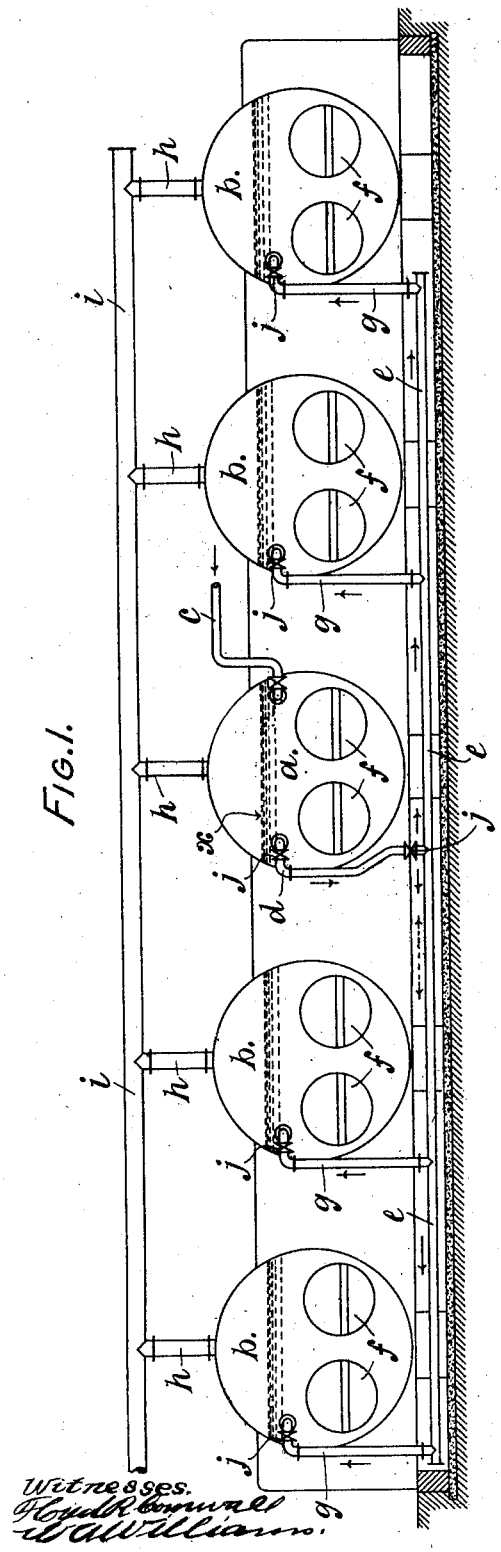
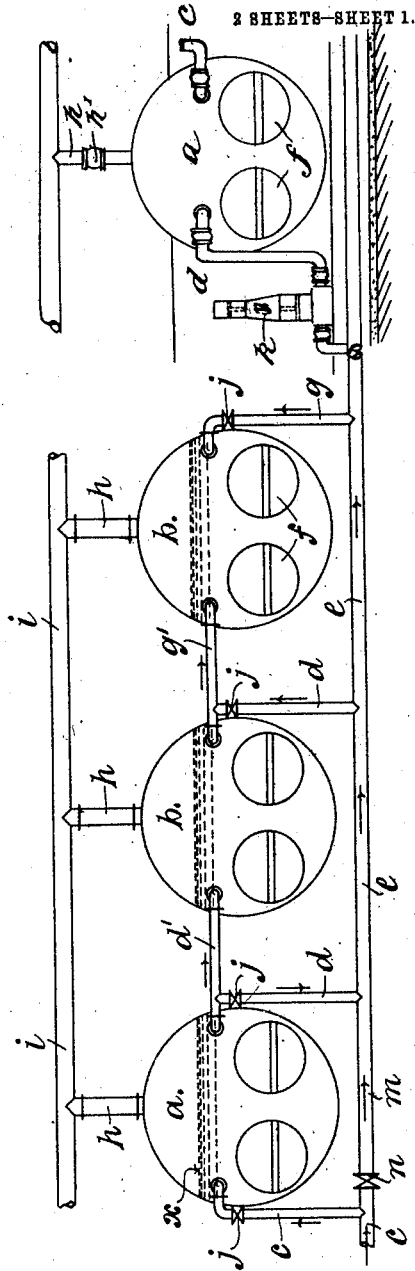
Inventor
J. E. Fletcher

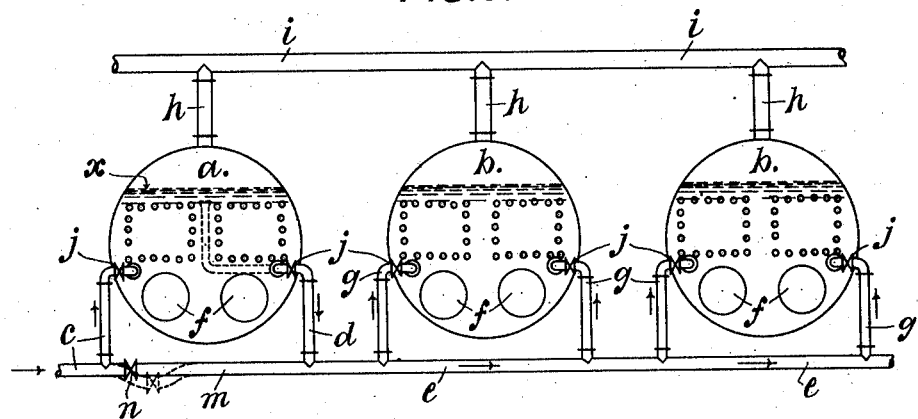
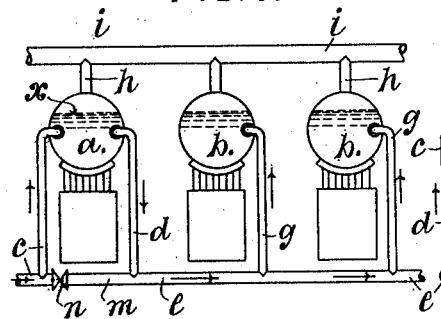
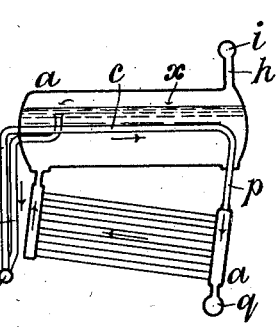
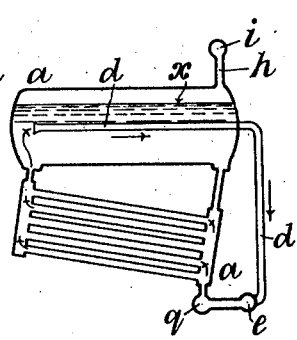
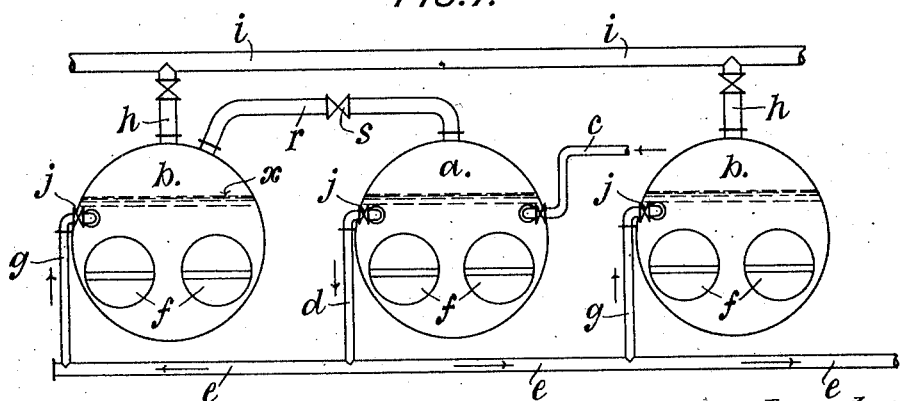

UNITED STATES PATENT OFFICE.

JOSEPH ERNST FLETCHER, OF DUDLEY, ENGLAND.

STEAM GENERATION.

998,568.  Specification of Letters Patent.  Patented July 18, 1911.

Application filed May 6, 1911. Serial No. 625,645.

*To all whom it may concern:*

Be it known that I, JOSEPH ERNST FLETCHER, a subject of the King of England, residing at Dudley, in the county of Worcester, England, have invented certain new and useful Improvements in or Connected with Steam Generation, of which the following is a specification.

This invention has reference to the generation of steam, and has for its objects and effects, among others, to provide improvements by which a battery or plurality of separately heated steam generators will work together, and evaporate water at a uniform rate, and also evaporate a greater quantity of water in a given time; and at the same time priming and scaling in boilers or steam generators will be diminished, and unequal strains prevented; while other effects are accomplished, as hereinafter specified.

In the following description of steam generating plant, the improvements hereunder are comprised.

The battery or plurality of boilers employed in a plant has a common water level, and the feed water is supplied by the pump or other forcing means, to one (or may be two) of the steam generators of the battery; while the water to the other steam generators is conveyed from this (or these) by a pipe to the other steam generators; and the water level is maintained at a common level in all the steam generators by means of this pipe or pipes, which connects them all up, and at the required level. This common level is thus obtained by gravitation wholly, or it may be partly by gravitation. The whole battery is thus put into steam and water equilibrium by the feed and the steam ranges, and maintained at a uniform temperature.

The feed water may be previously heated, or cold, and introduced into the steam generator at the usual level, or by means of a spray or the like into the steam space. All the generators will be connected by a common steam pipe or drum.

When a heavy call for steam, as frequently happens, is made on a battery arranged and adapted to operate as described, a ready reply is given, for when a sudden demand for steam is made, an instant reduction of pressure in all the generators, or the whole battery results, and fresh steam is produced to meet the case; while under usual conditions of a battery of steam generators, one or more of them in a group will steam more freely than the others, and although connected in common by a large main or steam drum, the effect of one or more badly steaming generators is to bring about a general lowering of pressure, accompanied by priming, and wet steam, this being the result generally of local drop in temperature; but by the improvements under this invention, these defects are obviated. Further, by the improvements, an increased rate of evaporation is obtained throughout the battery, so that the number of boilers in a battery can be diminished.

In the accompanying drawings, the application of the invention in several slightly modified manners to batteries of steam generators is illustrated; and the invention will be further described in connection with these applications and illustrations, their description being taken in the order of the figures.

Figure 1 is an elevation of a battery of steam generators, illustrating my invention. Fig. 2 is a similar view of a slightly modified form of the invention. Fig. 3 is an elevation of a battery of multi-tubular steam generators, illustrating my invention in connection therewith. Fig. 4 is an elevation illustrating the invention applied to steam generators of the water tube type. Fig. 5 is a side elevation of the same, the feed boiler being shown in section. Fig. 6 is a view similar to Fig. 5, but showing a slightly modified arrangement. Fig. 7 is an elevation of a battery of steam generators, illustrating another form of the invention. Fig. 8 is a detail view of a steam generator, and a modification of the invention.

Generally, throughout the different figures, the same letters and figures of reference are used to denote the same or corresponding parts wherever they occur.

The water heating and steam generating generator, that is, the one into which the feed water to be evaporated is first introduced, prior to its delivery to the others of the said generators or battery, is designated $a$, while the other generators are designated $b$.

$c$ is the pipe by which all the feed water is supplied to the heater generator $a$—which for convenience may be called the "feed-boiler"; $d$ is the pipe by which the water at the temperature of steam generation in this generator is taken off from it, after having passed through it, and been heated in it; and $e$ is the main pipe connected with the other several generators $b$, which conveys this water to them.

With regard to Fig. 1, which illustrates one application of the invention to a set or battery of "Lancashire" or like type of steam generators, the manner of the working of this system is as follows:—All, or the greater portion of the feed water to be supplied to the battery of steam generators is delivered by the pipe $c$ from the feed pumps or other forcing apparatus, into one part of the feed-boiler $a$; and in this case, it is delivered at a point near the water level $x$, that is, slightly below it, as indicated in full lines. In this feed-boiler, which generally is of the same construction as the other steam generators, the feed water is heated by fuel of any suitable kind, burned in the furnaces $f$, and steam is generated from it; hence this feed-boiler serves in the capacity of one of the steam generators of the battery, as well as a feed water heating boiler; the steam from it being conveyed to the main steam supply pipe $i$ of the battery, through the pipe $h$. Thus the water in this steam generator or feed-boiler will be, at least, at a temperature corresponding with that due to the pressure of steam employed in and supplied by the plant. The water at this temperature will be taken away from this feed-boiler through the pipe $d$ at a suitable point, such as shown by the drawing, and delivered into the feed main through $e$, whence it is conducted by the connecting branches $g$, to the several steam generators $b$; and in cases where suitable, the levels of the outlet from the feed-boiler $a$, and the point of inlet of the pipes $g$ to the generators $b$, will be substantially the same, so that the water would flow by gravity into the several boilers $b$ automatically; and its level will be maintained at practically a constant point throughout the whole, so that they will all work under practically equal conditions.

In some cases—and it may be in the majority of cases—the working of the system by gravity as just referred to, could not be sufficiently satisfactorily accomplished; and, therefore, in such cases, there is introduced between the feed-boiler $a$ and the feed distribution main $e$ for forcing the hot feed water, a pump, shown in Fig. 8, and marked $k$; and this pump would simply force the hot water delivered to it through the pipe $d$ into the main $e$; and so that under any conditions, the levels of the water in the several steam generators $b$ can be kept at a constant, and at the required point. Or, the flow of water by gravity from the feed-boiler $a$, to the generators $b$, may be effected or assisted by keeping the water level in the feed-boiler, at a somewhat higher level than the working level in the steam generators $b$. Suitable valves or cocks $j$ can be provided for the purpose of regulating the flow of water through these pipes, or closing or regulating them, in case of need.

The modified arrangement shown in Fig. 2 is the same as that shown in Fig. 1, with the exception that in addition to the pipes $d$, which communicate with the main distribution hot water feed main $e$, there are additional pipes $d^1$, which couple the several steam generators $a$ and $b$, as shown; the object and effect being to assist in the preservation of the common water level in the generators of the battery. That is to say, the feed water supplied through the pipes $c$ to the feed-boiler $a$ will pass to and through it, similarly as above described in connection with Fig. 1; and then this water, or some of it, can pass by way of the pipe $d$ into the feed main $e$, while another portion of it can pass direct into the next steam generator $b$, by the connecting pipe $d^1$; and, similarly, the steam generators $b$ are connected together by means of horizontal connecting pipes $g^1$, near the water level, as well as to the feed main $e$, by the pipes $g$. In such a system, the valves $j$ are more or less closed, or wholly closed, according to whether it is desired to use the common feed pipe $c$ for supplying the several steam generators $b$ with feed water from this main, or otherwise. In this modification there is also provided a pipe $m$, connecting the feed water pipe $c$ with the distribution feed main $e$, and having upon it a cock $n$, by which more or less water may, if desired, be permitted to pass directly from the supply or feed pipe $c$, connected with the feed-boiler $a$, into the distributing feed main $e$, at such a rate, and in such a quantity, as may be found necessary or desirable, so as to facilitate the keeping of the water level in all the boilers uniform, or for other purposes.

In Fig. 3 is shown an application of the invention in connection with a battery or plant of "multi-tubular" or "marine" type of steam generators. In this case, the feed water from the feed pipe $c$ is delivered to the feed-boiler at a point below the tubes; while the water to be delivered to the steam generators $b$ is taken off by the internal portion of the pipe $d$, near the surface of the water; and in this arrangement also, the generators $b$ are fed with water from the feed main $e$, by a feed pipe $g$, at each side of each of them. In this application also, an auxiliary pipe $m$, and cock $n$, are provided between the feed pipe c and steam generators b, similarly, and for the same purpose as set forth with reference to Fig. 2.

Figs. 4 and 5 show the invention applied to steam generators of the water tube type, in which a water and steam drum is disposed over the nests or groups of water-tubes; and Fig. 6 shows a slightly modified arrangement of this. In this case, the water is fed to the first steam and water drum of the feed-boiler a, similarly as in the other cases above; and from it, it is led by the pipe d to the feed main e, and delivered from it into the steam and water drums of the boilers b, by the pipes g. In this case, in order to promote the circulation, and the efficient heating of the feed water in the feed-boiler a, the feed or inlet pipe c may be led directly across the steam water drum (see Fig. 5), and carried down into one or more of the down pipes p, which lead to the lower tube headers, so that the water would pass into the water-tubes of the generators, and thence by the upper header into the water and steam drum; and from this drum, it will pass into an internal portion of the pipe d, the inlet orifice of which would be near the water level x, and be delivered to the feed main e. Or, instead of this arrangement, the feed water may be delivered into the feed-boiler a by way of the chamber q, which is commonly called a "mud drum," as shown in Fig. 6, whence it would pass through the water-tubes and upper header as just described, and then by way of the pipe d, be delivered to the feed main e. From this main, the water would pass into each of the other generators b, by way of their mud drums headers and tubes into the upper steam and water drums.

In the system of steam generation concerned, in order to obtain the maximum efficiency, it is very important that the water when delivered into the steam generators from the one (or more) of them, in which all the water to be converted to steam is introduced, is at the steam temperature of it, that is, at its minimum density, and also that the proper or required water levels in the generators fed from the feed steam generator, should be maintained. In order to obtain these conditions, it is necessary that the pressure and temperature in the feed steam generator should be capable of being controlled and regulated; and this is effected by the employment of a pipe r, shown in Fig. 7, which may be termed a "balancing pipe," interposed, and forming communication between the steam space of the feed generator a, and one of the other generators b of the battery; and it has in it, a pressure regulating valve s of any known suitable type, such as the loaded self-acting, or otherwise.

All the steam generated in the feed steam generator a passes by the balancing pipe r to the steam generator b which it communicates with; while the steam from the latter, and the rest of the steam generators, passes to the steam main i. By this means, if the valve s on the balancing pipe r be loaded, or regulated to choke the escape of steam from it, the pressure, and temperature of the water and steam in the feed generator a, can be regulated, and held higher than those in the other steam generators b.

The feed water pipe d from the feed steam generator a, to the feed water main e, may also, in some cases, be fitted with a pressure regulating valve, which may work either automatically, or be set by hand, and thus this plus or extra pressure and temperature in the feed generator will insure that the feed water entering the steam generators b of the battery, from the feed steam generator a, will be at the steam temperature of those generators; and that the proper or required levels in these boilers will be maintained at all times.

A modified manner of promoting the better feeding of the generators b with water from the feed-boiler a, may be effected by providing on the steam pipe h from the feed-boiler a, a loaded valve $h^1$ of the steam reducing type, of any known kind (shown in Fig. 8), so that a higher pressure in a, may be maintained. As an instance of where this may be more serviceable, the case where the feed-boiler a is placed at a lower level than the steam generators b, is one.

With regard to the chief points of differentiation between the present system and invention, and other systems, of working steam power plant, wherein a plurality or battery of steam generators are employed, in these former systems, frequently, feed water heaters are interposed between the feed water pumps or machinery, and the steam generators, in and by which the feed water is heated by the products of combustion of fuel, or by steam; and in some of such cases, this feed water heating mechanism consists of apparatus known as "fuel economizers", which consist generally of nests or groups of water tubes through which the feed water is made to pass on its way to the steam generators, and so arranged and placed as to absorb heat into the feed water; while in other cases, there has been proposed to be employed a separate boiler working at high pressure, and in which the water is boiled by burning fuel on a grate in same, and from which the hot water at or above the pressure of that of the steam in the steam generators to be supplied with hot feed water, is taken and delivered to said steam generators; but in the latter case this feed water boiler has had no steam taken from it, and it has not constituted therefore one of the steam generators of the battery or plant for supplying steam for power. In other cases again, both a feed water heater and a "fuel economizer" are used in the manner referred to. The objects of these contrivances have been to increase the temperature of the feed water before it enters the steam generator, in order that it shall be more readily converted to steam in them, and also to diminish the quantity of fuel for evaporating a given quantity of water; but under the present invention, before being delivered to all the steam generators, the feed water is first introduced into a primary apparatus, which, in itself, is a steam generator, as well as a water heater, and wherein the heat is applied to the water by the direct combustion of fuel in the furnaces of this steam generator; and not only is the water heated, but steam is also generated, and it constitutes in effect one of the several of the steam generators which constitute the battery; and, moreover, the feed water which is fed to this feed-boiler, as it is termed, may already be hot, having been preheated by first passing it through the feed water heater or economizers of the kind just referred to; in which case, of course, the feed-boiler is employed in addition to the preliminary or ordinary feed water heaters or economizers.

In the feed-boiler or primary generator, under this invention, the heating of the feed water it will be seen is pushed to the point where it is raised, at least, to the temperature corresponding with that due to the pressure at which steam is required to be produced in, and delivered from the power plant; so that steam is actually raised in it, and led away into the common steam supply main. And, as above stated, the pressure of this steam generated in the feed-boiler may be the same as that in the other steam generators of the plant, to which the water is being fed, and before it—the feed water—is fed into said generators.

In the cases illustrated in the drawing, the primary steam generator or feed-boiler $a$ is of the same form and size practically as the others of the battery or plant; but in special cases, or where desired, this feed-boiler may be of a construction other than those constituting the main steam generators, to which the feed water from this primary or feed-boiler is led; but it (or they, if more than one be used) must be of sufficient size or heating capacity to not only raise the temperature of the whole of the feed water passing to the whole of the battery of boilers, to which it is applied, to the boiling point (or higher) of the water, corresponding with the pressure of steam being generated by the battery, but must in addition be capable of generating some steam at that (or a higher) pressure from the feed water, while passing through it to the battery; the steam so generated passing directly (or through a steam reducing valve) into the steam main common to the battery or plant. By thus feeding into a battery of steam generators only water which is at the same as, or a higher temperature than the water in these generators, and at which temperature steam is being generated, their duty is confined almost entirely to the generating of steam from such water; they being relieved from the duty of raising the water to the temperature at which steam is liberated from it. Also, by thus raising the temperature of the feed water in the feed boiler to a point corresponding with that from which steam is being generated in the other steam generators of the plant or battery, a very large proportion of the scale forming matter carried by the feed water into the feed boiler is deposited in it, and thus the hot feed water passing into the steam raising generators from the feed-boiler is relieved to a very large extent of scale forming matter, and very little scale is deposited in these steam raising generators; which are thus able to work more efficiently, and are less liable to expansion or contraction strains than would otherwise be the case; and in a large measure, in consequence, a greater quantity of water is evaporated from the generators in a given time under this system, than if fed with water in the usual way, other conditions being the same. Or, for a given amount of water evaporated in a given time, less fuel is required.

What is claimed is:—

1. The method of generating steam in a plurality of steam generators, consisting in introducing all the water from which steam is to be generated in the said generators, into one steam generator (or it may be more) of the set, and heating it therein by fuel burned therein, and at the same time generating steam from it in said generator (or generators), which steam constitutes a part of the steam generated by the battery for power or other purposes; and withdrawing the water from said generator (or generators) at the temperature of steam generation, and delivering it to the others of said set of generators, wherein it is separately heated by fuel burned therein; for the purposes specified.

2. The method of generating steam in a plurality of steam generators, consisting in introducing all the water from which steam has to be generated in the said generators, into one steam generator (or it may be more than one) of the set, and heating it therein by fuel burned therein, and at the same time generating steam from it in said generator or generators and maintaining such steam at a pressure higher than that in the other steam generators of the battery, and conveying this steam into the steam space of another of said steam generators, and withdrawing the water from said feed generator or generators at the temperature of steam generation therein, and delivering it to the others of said set of generators, and wherein it is converted to steam by fuel burned therein; substantially as set forth.

In testimony whereof I have signed my name to this specification in the presence of two subscribing witnesses.

JOSEPH ERNST FLETCHER.

Witnesses:
 WILLIAM TROATH,
 WILLIAM HENRY HILL.

Copies of this patent may be obtained for five cents each, by addressing the "Commissioner of Patents, Washington, D. C."